United States Patent [19]
Czarno

[11] Patent Number: 4,585,599
[45] Date of Patent: Apr. 29, 1986

[54] AIR CLEANING DEVICE

[76] Inventor: Yanush E. Czarno, P.O. Box 2064, Miami Beach, Fla. 33140

[21] Appl. No.: 659,448

[22] PCT Filed: Feb. 17, 1984

[86] PCT No.: PCT/US84/00243
§ 371 Date: Oct. 5, 1984
§ 102(e) Date: Oct. 5, 1984

[87] PCT Pub. No.: WO84/03230
PCT Pub. Date: Aug. 30, 1984

Related U.S. Application Data

[63] Continuation-in-part of Ser. No. 467,655, Feb. 18, 1983, abandoned.

[51] Int. Cl.⁴ ............................................. B01D 47/02
[52] U.S. Cl. ...................................... 261/2; 261/18 R; 261/29; 261/36 R; 55/228; 55/239; 55/247; 55/421; 210/799
[58] Field of Search ............... 55/85, 89, 228, 239, 55/247, 249, 338, 421; 261/2, 318 R, 29, 36 R, 5; 210/799

[56] References Cited

U.S. PATENT DOCUMENTS

| | | | |
|---|---|---|---|
| 2,208,673 | 7/1940 | Hopkins | 55/239 |
| 2,788,954 | 4/1957 | Paasche | 55/228 |
| 3,011,769 | 12/1961 | Umbricht | 261/29 |
| 3,733,787 | 5/1973 | Winningham | 55/228 |

FOREIGN PATENT DOCUMENTS 514166  6/1976  U.S.S.R. ............................. 55/228

Primary Examiner—David L. Lacey
Attorney, Agent, or Firm—Melvin K. Silverman

[57] ABSTRACT

Disclosed is an air cleaner which directs dirty air onto the surface of a scrubbing liquid (41, 141) plus recirculates the scrubbing liquid and air contaminants through a cleaning liquid (43, 143). Additionally, filters (17, 117) may be provided across the recirculation path of the scrubbing liquid. This two liquid system provides a sufficient volume to establish a good recirculation pattern for practical scrubbing and also minimizes the amount of scrubbing liquid; the two liquids may be oil (the scrubbing liquid) floating on water (the cleaning liquid).

13 Claims, 6 Drawing Figures

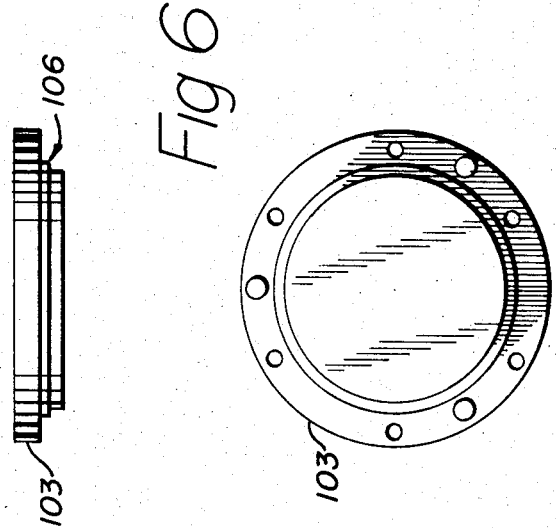
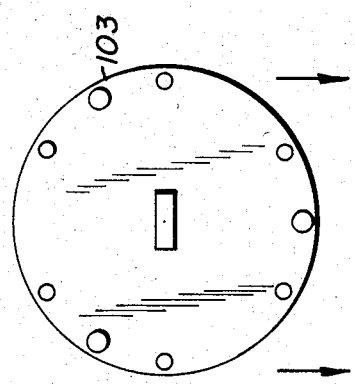
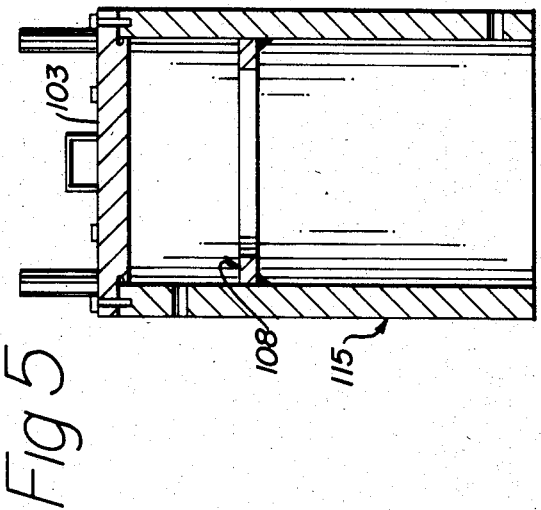

AIR CLEANING DEVICE

REFERENCE TO RELATED APPLICATION

This case is a continuation in part of application Ser. No. 467,655, filed Feb. 18, 1983, now abandoned.

FIELD OF THE INVENTION

This invention relates generally to air cleaners, and, in particular, to air cleaners which scrub dirty air by passing it over the surface of a liquid.

DESCRIPTION OF THE PRIOR ART

A variety of air cleaners which operate on the principle of passing dirty air over a surface of a liquid (the liquid to trap the dirt in the air) are known. For example, Pando U.S. Pat. No. 1,817,265 discloses a device which directs a stream of dirty air perpendicularly onto the surface of a chamber of water over which is mounted a screen, and the dirt suspended in the air is trapped by the screen and subsequently dissolved by the water which moves in and out of control with the screen. Hopkins U.S. Pat. No. 2,208,673 discloses a device which directs a stream of dirty air perpendicularly onto the surface of a quantity of oil plus gives the incoming air stream a spiral or cyclone movement about the axis perpendicular to the oil surface; the dirt in the air adheres to the oil and is thereby scrubbed clean. Mare U.S. Pat. No. 3,745,745 discloses a dirty air scrubber which employs a plurality of nozzles for directing the air perpendicularly against the surface of a scrubbing liquid such as water; the close proximity of the nozzles to each other together with baffles at the ends of the nozzles and parallel to the liquid surface creates extra turbulence as the scrubbed air from adjacent nozzles collides. Carlson U.S. Pat. No. 4,005,999, discloses a air cleaner which includes repeated circulation of the dirty air perpendicularly onto the surface of a scrubbing liquid, the air escaping after the first scrubbing being redirected to a second scrubbing, and so forth.

All of these prior-art devices suffer from the problem of the water, oil, or other scrubbing liquid becoming saturated with the dirt near the surface upon which the dirty air impinges, and thereby lessening the effectiveness of the scrubbing liquid.

SUMMARY OF THE INVENTION

The present invention provides an air cleaner which directs dirty air onto the surface of a scrubbing liquid plus recirculates the scrubbing liquid by forcing the scrubbing liquid, near the point of impact with the dirty air, down and into a cleaning liquid which is denser than the scrubbing liquid and immiscible with it. Additionally, scrubbing filters may be provided across the recirculation path of the scrubbing liquid. For example, in a two liquid system such as oil floating on water, the oil is the air scrubbing liquid and the water in turn cleans the oil. This also minimizes the amount of scrubbing liquid, yet still provides a sufficient volume to establish a good recirculation pattern for best cleaning.

The recirculation of the scrubbing liquid solves the problem of build-up of dirt near the point of impact of the dirty air on the scrubbing liquid.

BRIEF DESCRIPTION OF THE DRAWINGS

FIG. 5 shows a cover for use in the second preferred embodiment; and

FIG. 6 shows other views of the top of FIG. 5.

DESCRIPTION OF THE FIRST PREFERRED EMBODIMENT

Figure 3:
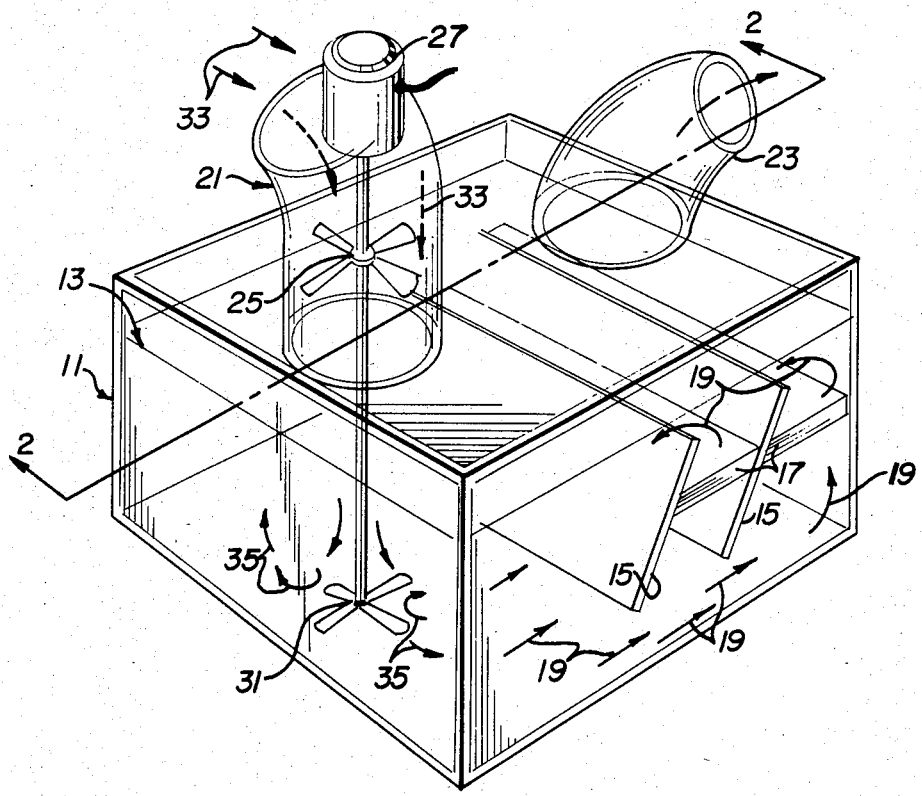
FIG. 3 shows a perspective view of the first preferred embodiment of the invention.

FIG. 3 shows a first preferred embodiment of the present invention. Chamber 11 is partially filled with scrubbing liquid 13 (such as oil, water, or a combination as described below). Two baffles 15 are positioned in chamber 11, hold filters 17, and permit scrubbing liquid 13 to flow both under their bottoms and over their tops as indicated by arrows 19. Chamber 11 has inlet 21 and outlet 23; fan 25, driven by electric motor 27 is included in inlet 21. Impeller 31 is also attached to electric motor 27; electric motor 27 drives fan 25 to force air down inlet 21 as shown by arrows 33, and drives impeller 31 to force scrubbing liquid frm the surface downwards usually spirally as shown by arrows 35. Impeller 31 has a straight shaft plus vanes at the bottom end for use with a single liquid. For use with a two liquid system, as described below, impeller 31 has a threaded shaft plus vanes at the bottom end. The pitch of the vanes affects the motion of the liquid(s), from a simple recirculation to a blender-type action.

Figure 1:
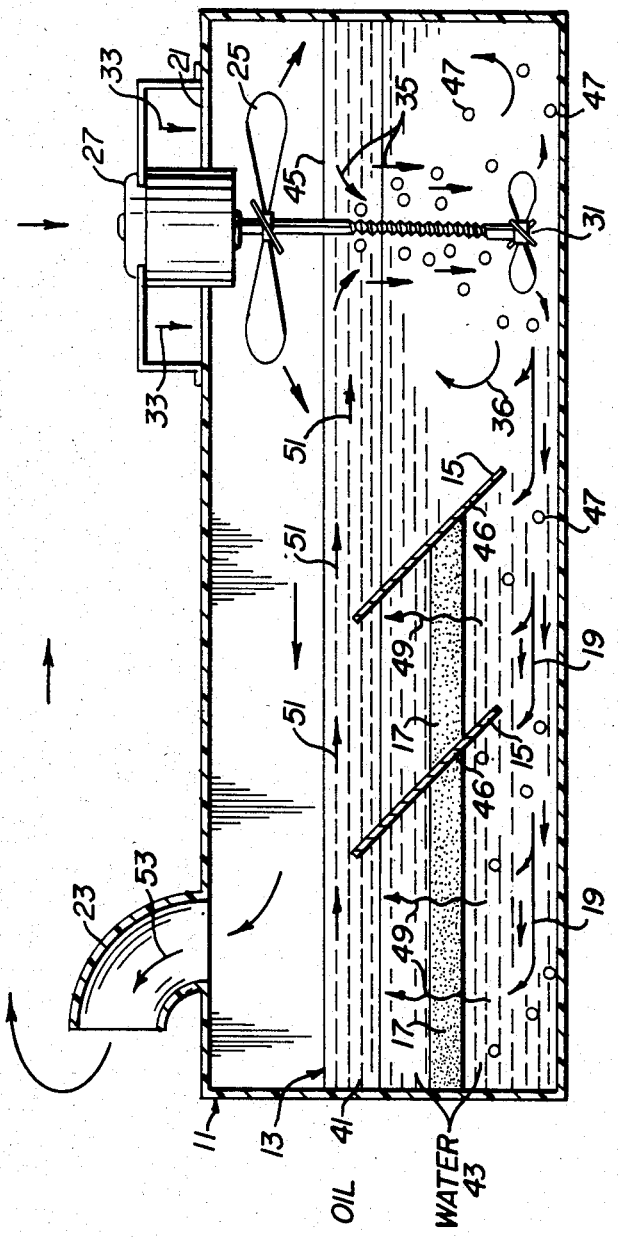
FIG. 1 shows a view of a first embodiment of the invention along line 2—2 of FIG. 3.

FIG. 1 shows a cross-section of the preferred embodiment of FIG. 3 but with a different arrangement of fan 25, electric motor 27 and inlet 21. The use of a combination of oil and water for scrubbing action is shown in FIG. 1, the upper liquid layer 41 being oil and the lower liquid layer 43 being water. Operation of the preferred embodiment is most easily made with reference to FIG. 1, and is as follows.

Air containing contaminants is drawn into inlet 21 by fan 25 (driven by electric motor 27) as shown by arrows 33. This air hits surface 45 of oil 41 and the contaminants are absorbed by oil 41 at surface 45. Impeller 31, including its threaded shaft, draws the contaminated oil at surface 45 down along the direction shown by arrows 35, and the contaminated oil forms bubbles 47 in water 43. Sometimes a vortex forms in the water about the shaft. Impeller 31 further forces a fraction of bubbles 47 under baffles 15, although many recirculate as shown by arrow 36, for transfer of contaminants from bubbles 47 into water 43. Behind baffles 15 bubbles 47 rise in water 43 and pass through filters 17 and continue rising until they rejoin the layer of oil 41, as shown by arrows 49. To compensate for contaminated oil at surface 45 being driven down in a way by impeller 31, oil 41 flows as shown by arrows 51. Also water 43 recirculates by passing through holes 46 in baffles 15.

Simultaneously, the air driven by fan 25 against surface 45 has lost its contaminants to oil 41 and flows over the surface of oil 41 and out outlet 23 as shown by arrows 53.

The contaminants picked up by oil 41 at surface 45 and carried by bubbles 47 are caught in filters 17, thus providing a partial cleansing of oil 41. This cleansing, together with a recirculation of oil 41 by impeller 31 produces oil at surface 45 which is not saturated with contaminants and able to efficiently absorb contaminants carried by the air driven by fan 25. Further, the use of water 43 as a filter and oil scrubber permits different types of water and oil for recirculation-scrubbing-patterns 46 and 36. Also, use of a relatively small quantity of oil 41 while still providing capacity for handling a large volume of air carrying contaminants.

Filters 17 may be removable and reusable. The main function of filters 17 is to keep any water-soluble dust at the bottom of chamber 11 so it will not accumulate and flow over baffles 15. Contaminants that are soluble in water will be drawn out of bubbles 47 and into water 43 thereby helping to clean oil 41. Contaminants that are not caught in filter 17 are locked in the portion of chamber 11 behind baffles 15 and float on the water. A further advantage of using both oil and water layers is avoidance of the humidity increase from water evaporation in a water-only system.

Figure 2:
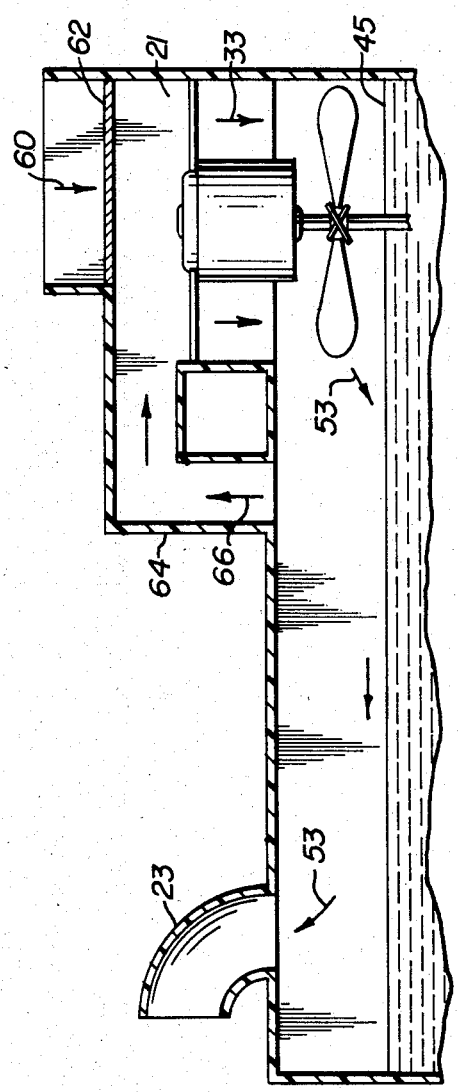
FIG. 2 shows a feedback means for use in FIG. 1.

As shown in FIG. 2, the incoming air may include a feedback of cleaned air to yield multiple hits on surface 45. The contaminated air flows as shown by arrow through a preliinary filter 62 and down inlet 21 along arrows 33 and hits surface 45. A portion of the air then flows out outlet 23 and the remainder flows up feedback pipe 64 and back into inlet 21 along arrow 66.

A prototype of the preferred embodiment of FIG. 1 was constructed and tested as follows. The unit prototype was cleaned and 10,000 ml of distilled water plus 2000 ml of light mineral oil was added. The fan was started and air measurement was measured at twin 2¼" outlets of the air cleaning device. The average air expelled was forty-four cubic feet per minute. The unit was operated in an average environment for five days with analysis of the water solution being made daily through a small hole drilled in a front baffle. All material was extracted with acetone to remove any oil from the samples before solids test.

| | Result of Test | |
|---|---|---|
| Test start | Sample #1 | Sample #2 |
| Suspended solids | 8 ppm | 10 ppm |
| Total solids | 18 ppm | 22 ppm |
| Day 1 | | |
| Suspended solids | 241 ppm | 292 ppm |
| Total solids | 310 ppm | 330 ppm |
| Day 2 | | |
| Suspended | 410 ppm | 460 ppm |
| Total Solids | 480 ppm | 470 ppm |
| Day 3 | | |
| Suspended solids | 520 ppm | 600 ppm |
| Total solids | 670 ppm | 710 ppm |
| Day 4 | | |
| Suspended solids | 900 ppm | 950 ppm |
| Total solids | 930 ppm | 930 ppm |
| Day 5 | | |
| Suspended solids | 1400 ppm | 1310 ppm |
| Total Solids | 1200 ppm | 1230 ppm |

A test was made using the remaining sample to establish the total solids in the sample both oil and water. The oil was washed and the dirt separated. The total solids removed after five days was 8.2 grams. Days 4 and 5 show a higher suspended solid count than total solids count. This is due to the oil in the liquid and the heterogeneous nature of the mixture.

DESCRIPTION OF SECOND PREFERRED EMBODIMENT

Figure 4:
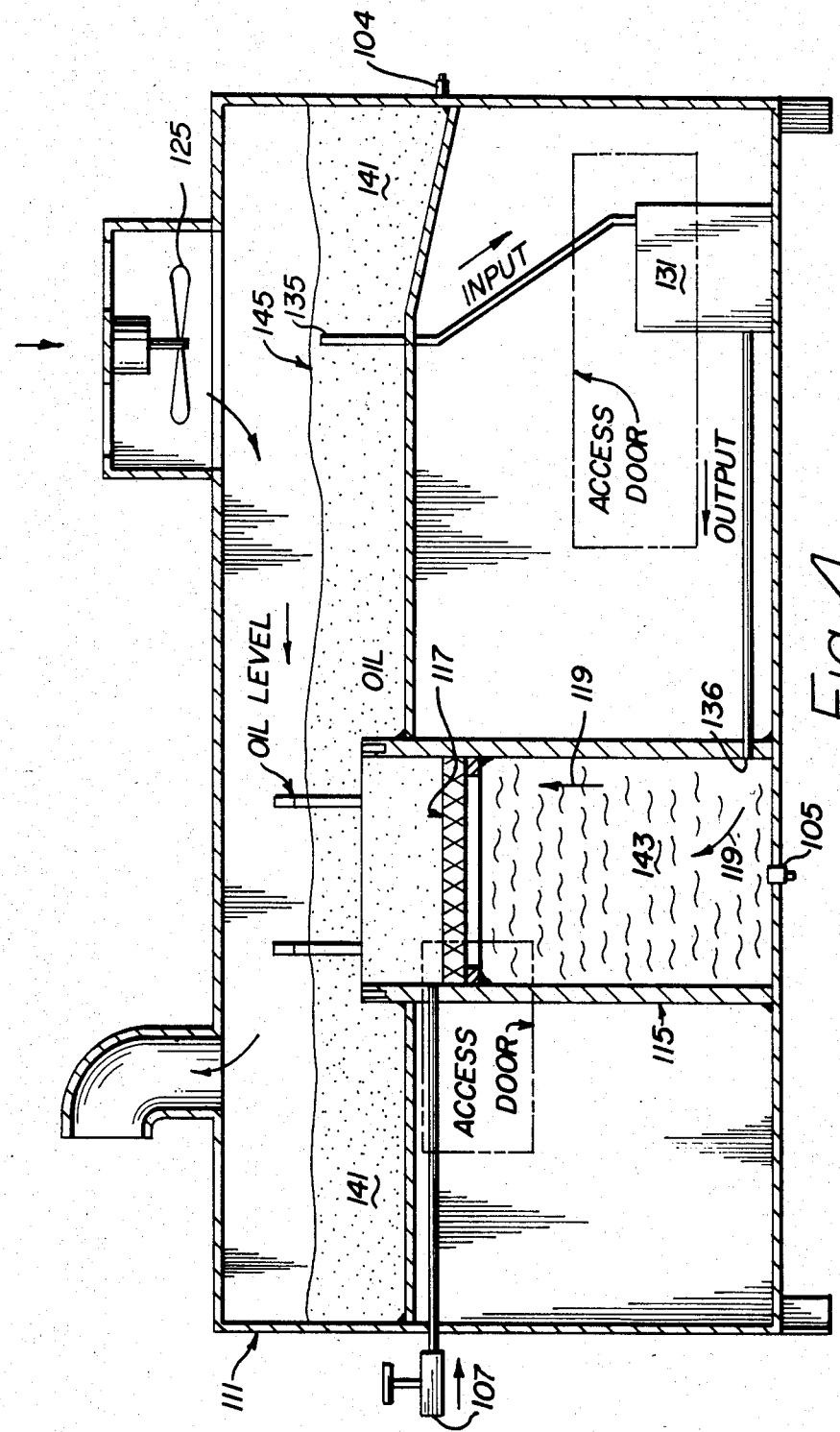
FIG. 4 shows a cross-sectional view of a second preferred embodiment.

FIG. 4 shows a cross-section of a preferred embodiment of the present invention. Upper chamber 111 is partially filled with oil 141 which, as in the first preferred embodiment, is the scrubbing liquid over which contaminated air is directed by fan 125. Contaminants are absorbed by oil 141 at surface 145. Pump 131 draws the contaminated oil down through inlet 135 and ejects it at outlet 136 into lower chamber 115 which is filled with water 143. The ejected oil floats up through water 143 as shown by arrows 119 and through filter 117 to rejoin oil 141 in upper chamber 111. The passing of the ejected oil through water 143 and filter 117 provides two cleaning actions, absorption of contaminants by water 143 and trapping of contaminants by filter 117.

As illustrated in FIGS. 5 and 6 a top 103 may be fit over the top of lower chamber 115 so that water 143 may be replaced (drain 105 and inlet 107) and filter 117 reversed flushed without disturbing oil 141. Top 103 may have an O-ring seal 106. Further, oil 141 may be replaced (drain 104 and inlet 107) without use of top 103. Filter 117 is held by filter stop 108 in lower chamber 115.

It is to be noted that there may be placed within said oil 141 certain medicinal additives such as vitamin E and lecithin. Also, pump 131 may have incorporated thereinto timing means by which the recirculation of either or both of the two cleaning fluids may be selectively controlled.

While there has been above shown and described the preferred embodiment of the present invention, it will be understood that the invention may be embodied otherwise than as herein specifically illustrated or described, and that within such embodiments certain changes in the detail or construction, and in the form and the arrangement of the parts, may be made without a departing from the underlying idea or principles of this invention in the scope of the appended claims.

I claim:
1. An air cleaner for cleaning air containing contaminants, comprising:
    (a) a chamber having an air inlet and an air outlet;
    (b) a first layer of liquid for scrubing air, said first layer of liquid disposed below said air inlet and air outlet;
    (c) a second layer of liquid, the liquid of said second layer being substantially non-mixable with the liquid of said first layer, said first layer floating upon said second layer, said second layer acting to scrub said first layer of liquid;
    (d) means for circulating the first liquid layer through said second liquid layer to thereby enhance scrubing of said first liquid by said second liquid; and
    (e) means for driving said air-containing contaminants through said inlet and, thereafter, against said layer of first liquid and out said outlet.
2. The air cleaner as recited in claim 1, in which said first liquid layer comprises oil and said second liquid layer comprises water.
3. The air cleaner as recited in claim 2, in which said oil further comprises medicinal additives mixed therein.
4. The air cleaner as recited in claim 1, further comprising:
    a filter position so as to be in said second liquid and positioned within said circulating means to thereby act upon said first liquid layer as it is recirculated through said second liquid layer.

5. The air cleaner as recited in claim 4, wherein said circulating means includes
means for providing a pressurized flow of said liquid of said first layer within said second liquid of said second layer.

6. The air cleaner as recited in claim 4 further comprising:
at least one baffle position within said chamber such that said first liquid layer passes under and over said at least one baffle in opposite directions, said at least one baffle disposed between said filter and a surface portion of said first liquid layer.

7. An air cleaner for cleaning air containing contaminants comprising:
(a) a chamber having an air inlet and an air outlet;
(b) a first layer of liquid for scrubbing air, said first layer partially filling said chamber, said first layer of liquid disposed below said air inlet and said air outlet, said outlet being in fluid communication with the surface of said first layer of liquid;
(c) a second layer of liquid, the liquid of said second layer being substantially non-mixable with the liquid of said first layer, said first layer floating upon said second layer, said second layer acting to scrub said first layer of liquid;
(d) means for driving said air-containing contaminants through said inlet and, thereafter, against said first layer of liquid and out said outlet; and
(e) means for recirculating said first liquid layer through said second liquid layer to thereby enhance the scrubbing of said first liquid by said second liquid.

8. The air cleaner as recited in claim 7, further comprising:
(a) a filter positioned so as to be in said second liquid and positioned within said recirculating means to thereby act upon said first liquid layer as it is recirculated through said second liquid layer.

9. The air cleaner as recited in claim 8 wherein said recirculating means includes means for providing a pressurized flow of said liquid of said first layer.

10. The air cleaner as recited in claim 8 further comprising:
at least one baffle positioned within said chamber such that said first liquid layer passes under and over said at least one baffle in opposite directions, said at least one baffle disposed between said filter and a surface portion of said first liquid layer.

11. The air cleaner as recited in claim 7 in which said driving means is positioned and arranged so as to drive air:
against said first layer of liquid at an acute angle relative to the surface thereof, thereby optimizing the effectiveness of cleaning of the air by said first layer of liquid.

12. The air cleaner as recited in claim 7 in which said liquid of said first layer comprises oil and said liquid of said second layer comprises water.

13. The air cleaner as recited in claim 12 in which said oil further comprises medicinal additives mixed therein.

* * * * *